United States Patent [19]
Yamashita

[11] 3,963,314
[45] June 15, 1976

[54] COLOR DISPLAY DEVICE

[75] Inventor: Akio Yamashita, Kawanishi, Japan

[73] Assignee: Matsushita Electric Industrial Co., Ltd., Kadoma, Japan

[22] Filed: Sept. 18, 1974

[21] Appl. No.: 507,204

[30] Foreign Application Priority Data
Sept. 29, 1973 Japan.............................. 48-109996

[52] U.S. Cl............................................ 350/160 R
[51] Int. Cl.²........................................ G02F 1/36
[58] Field of Search................... 350/160 R, 160 LC

[56] References Cited
UNITED STATES PATENTS

| | | | |
|---|---|---|---|
| 3,521,941 | 7/1970 | Deb et al. | 350/160 R |
| 3,578,843 | 5/1971 | Castellion | 350/160 R |
| 3,712,710 | 1/1973 | Castellion et al. | 350/160 R |
| 3,836,231 | 9/1974 | Cole | 350/160 LC |
| 3,837,730 | 9/1974 | Hatfield et al. | 350/160 LC |

*Primary Examiner*—Vincent P. McGraw
*Assistant Examiner*—Jon W. Henry
*Attorney, Agent, or Firm*—Cushman, Darby & Cushman

[57] ABSTRACT

This invention relates to a novel Color Display Device constructed in the shape of a flat box. The top and bottom covers of such box have each electrode on each inner face thereof. At least one of the pair of electrodes is transparent, and also at least one of the pair has a dielectric layer on its inner face. A certain solution containing dye, is filled in the space between the pair of electrodes, and when a voltage is impressed across these electrodes, a change occurs in the light absorption of the dye solution, causing a change in the tint or the saturation of color to said solution visible under a visual light, and thus resulting in a color display.

10 Claims, 9 Drawing Figures

3,963,314

1

COLOR DISPLAY DEVICE

BACKGROUND OF THE INVENTION

Known as color display devices there have been Braun tubes, projector system employing light-bulbs, liquid crystal devices, electro-luminiscent devices, etc. but their merits have almost invariably been accompanied by some sorts of disadvantages. Examples of such disadvantages are as follows:

The Braun tube requires a high voltage source and occupies a large space, and furthermore, the size of its screen is limited. The light-bulb arrangement also requires a large space. In the liquid crystal device, the thermal characteristic is not satisfactory and the visibility as well as the contrast is poor.

In the case of electro-luminiscence device, the brightness is inadequate and its life is not long enough.

SUMMARY OF THE INVENTION

This invention is intended to provide a new color display device entirely different from such conventional counterparts as mentioned above. It provides that the size and shape can be freely chosen and it is highly economical by being long-lasting and consuming little power.

In brief, this invention is characterized in that at least one of a pair of electrodes, at least one of which is transparent, has a dielectric layer on its inner face, and a dye solution is filled in the space between said two electrodes, across which electrodes a voltage is impressed to cause a change to the color of the dye solution.

BRIEF EXPLANATION OF THE DRAWING

FIG. 6 represents one example of said device, in which,

FIG. 6A is a perspective view and

FIG. 6B is a sectional side-view thereof, and

DETAILED DESCRIPTION OF THE INVENTION

The dyes are generally classified into organic dyes and inorganic dyes. As described herein, mostly the organic dyes will be referred to, but the same principle applies alike to both types. The organic dyes imply organic compounds exhibiting colors, such as biodyes contained in animal or human bodies or in plants, as well as synthetic dyes. The presence of colors is due to the existence of absorption bands in the visual spectrum range; in other words, because the absorption bands selectively absorb the visual lights when the lights are emitted. Especially in the case of organic dyes, the above-mentioned phenomenon occurs when a dye molecule contains both a chromophore, for instance, a conjugated double bond group, and an auxochrome, for instance, a hydroxyl group. Such effect of the dye to change the absorption spectrum and the light-emitting spectrum by means of the electric field is known as the electro-chromism. However, this electro-chromism has not yet been developed to such a stage as to make a change of color actually visible to the human eyes. The reason is that the electric energy that can be impressed on the dyes is not adequate. For example, a photosensitive dye:

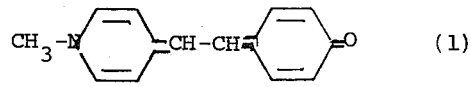

is a dye having the absorption maximum at 588 m$\mu$, but it receives the stabilization by a solvent and changes the absorption spectrum.

In other words, since the polarization amount of dye is changed by the dipole of solvent, the absorption spectrum also changes. Therefore, this invention makes it the principle to shift the dipole of solvent by an environmental electric field and resultantly, to change the amount of polarization of dye in order to cause a color change under a visual light.

Figure 1:
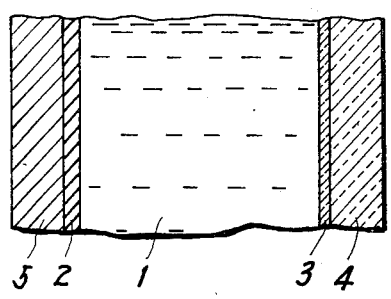
FIGS. 1 to 5 are partial sectional views of examples of the color display devices embodying this invention.

FIG. 1 shows an example of the color display device of this invention, wherein, numeral 1 indicates a dye solution, numeral 3 a transparent electrode, numerals 4 a glass, numeral 5 a metal electrode, and numeral 2 a dielectric layer provided on the inside face of the metal electrode 5.

Now, a dye having the formula as

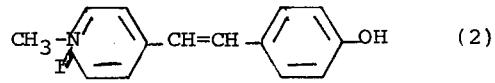

is dissolved in a solvent dimethyl sulfoxide, an absorption maximum is made at 392 m$\mu$. The dimethyl sulfoxide is a polar solvent having specific dielectric constant 45, in which the dye is receiving stabilization by the dipole of solvent. By assuming in approximation the dye molecule as a sphere of diameter $a$ and the solvent as a continuous dielectric having dielectric constant $\epsilon$, the stabilization factor will be shown by formula:

$e^2/2a (1-1/\epsilon)$, wherein e is the electric charge of an electron.

If a voltage is impressed across the transparent electrode 3 and the metal electrodes 5 of FIG. 1. while receiving stabilization by the solvent as above, an electric field is impressed onto the dielectric layer 2 and the dye solution 1. By this electric field the orientation of dipole of the solvent changes and alter the stabilization effect on the dye to change the polarization amount of the dye. Thereby the absorption maximum shifts and the color changes.

By providing the dielectric layer 2 in FIG. 1, it is prevented that the dye solution receives a permanent change due to compounding or decomposing of the dye molecule by electrochemical reactions that may occur when a current is made to flow through the dye solution. It is generally desirable for this dielectric layer to have a large dielectric constant, but if it is chemically stable, the dielectric layer can be made very thin, and therefore, a small dielectric constant may suffice. For instance, either ferroelectric substance such as $BaTiO_3$, PbTiO$_3$, CeF$_3$, or dielectric substances such as SiO, Ta$_2$O$_5$, TiO$_2$, SiN, Al$_2$O$_3$, polyethylene, polypropylene, polystylene, etc. can be utilized. Even with small dielectric constant of the dielectric layer, if its thickness is very thin than that of the dye solution, the electric field will be impressed onto the solution fairly well. When the dielectric layer(s) is thick a high voltage is necessary for operation, while when the dielectric layer is too thin it is easily destroyed by a discharge therethrough. Therefore, the thickness is selected, for instance, $10^{-6}$ – $10^{-2}$ mm in accordance with operation voltage applied across the electrodes.

In the case of FIG. 1, a metal electrode, for instance, of Al, Ta, Pt or Cu is employed, on whose inner faces the dielectric layer 2 is provided, but from the principle of this invention, the following constitutions also are applicable.

Figure 2:
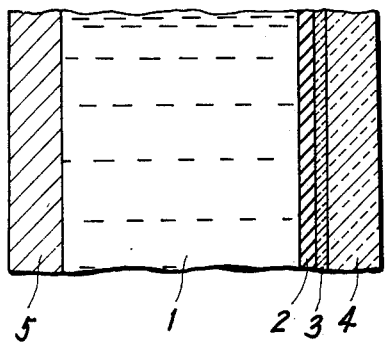

FIG. 2 is a case where the dielectric layer 2 is provided on the inner face of the transparent electrode 3. In this case, the dielectric layer 2 is preferred to be of a transparent substance such as SiO. Hereinafter, the same symbols in the figures designate the same parts as those in FIG. 1.

Figure 3:
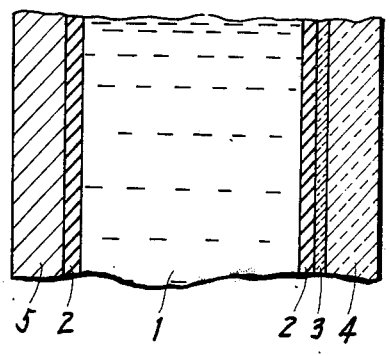

FIG. 3 is a case where the dielectric layers 2,2 are provided on inner surfaces of both the metal electrode 5 and transparent electrode 3.

Figure 4:
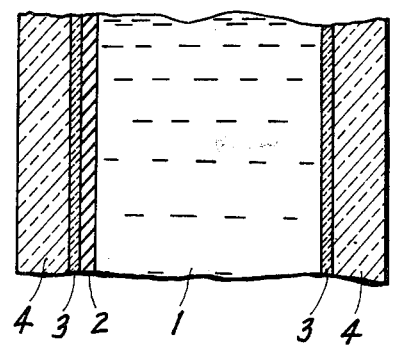

FIG. 4 is a case which has transparent electrodes 3,3 on both sides, but only one of them is provided with the dielectric layer 2.

Figure 5:
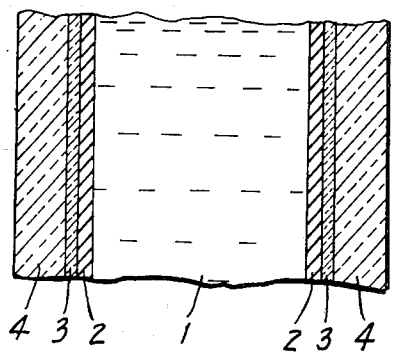

FIG. 5 is a case which has transparent electrodes 3,3 as well as dielectric layers 2,2 on both sides.

A detailed constitution is now described referring to a representative example shown in FIG. 5, wherein the dye of formula (2), the dimethyl sulfoxide as a solvent, a dielectric layer of an evaporated film of SiO and transparent electrodes of tin oxide are used.

Figure 6:
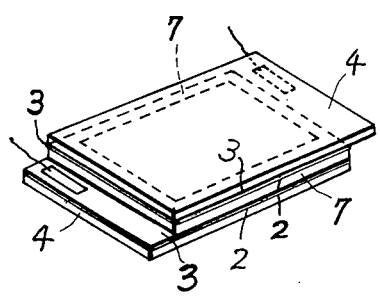

A concrete construction of the cell of the above-mentioned example is shown in FIG. 6, wherein numeral 1 indicates a dimethyl sulfoxide solution containing 0.1 weight per cent of the dye 2, numerals 4,4 a pair of Nesa glass with SiO films 2,2 formed on the inner faces of transparent electrodes 3,3 and numerals 7,7 a glass spacers having thickness of 0.1 mm.

Figure 7:
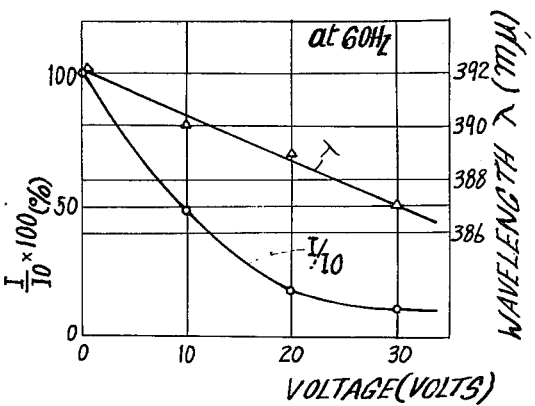
FIGS. 7 and 8 are charts showing a relative light-absorbance characteristic and a wavelength characteristic, respectively, of said device.

When no voltage is impressed, this constitution has the absorption maximum at the wavelength of 392 m$\mu$ and appears yellow, but as the voltage of 2 volts up is impressed, as shown in FIG. 7, the absorption maximum begins gradually shifting from 392 m$\mu$ toward the short wavelength side and the intensity begins waning.

Figure 8:
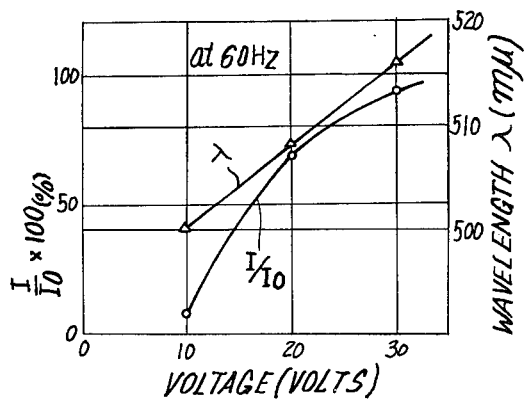
Figure 6:
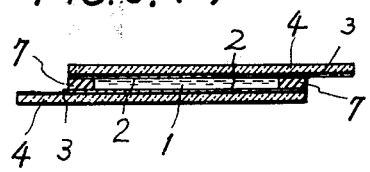

Simultaneously, a new absorption appears around the wavelength of 500 m$\mu$. As the voltage is increased, this absorption shifts toward the long wavelength side and the intensity gradually increases. Such movement is shown in FIG. 8. When this absorption appears, the color becomes red. When a direct current voltage is used, the color becomes red from around 3–5 V.

In FIGS. 7 and 8, $$\frac{I}{I_0} \times 100(\%)$$

indicates a relative absorbance (optical density), $I_0$ indicates a basic absorbance at the zero voltage and $\lambda$ indicates a wavelength.

For the dye to display such a color change mentioned above, those showing the solvent effects are the more desirable, such as, for instance, cyanine dyes. For the solvent, polar solvents are especially desirable. The polar solvents comprize hydroxyl groups and ketone groups and have strong polarity and high dielectric constant. Examples are methyl alcohol, ethyl alcohol, isopropyl alcohol, butyl alcohol acetone and methyl ethyl ketone. However, even non-polar solvents can incur a slight color change, since they have a small dipole.

The electric power consumption of the cell mentioned in the example was about 10 $\mu$W/cm$^2$. Other examples have similar consumption.

Further examples of dyes are:

As organic dyes: nitroso dyes represented for example by naphthol green B, nitro dyes represented for example by naphthol yellow S, azo dyes represented for example by amaranth, stilbene dyes represented for example by chrysophenine G, diphenylmethane dyes represented for example by auramine, triarylmethane dyes represented for example by malachite green, xanthene dyes represented for example by rhodamine B, acridine dyes representd for example by acridine orange R, quinoline dyes represented for example by quinoline yellow, methine dyes represented for example by astrazon pink FG, polymethine dyes, thiazole dyes represented for example by thioflavine T, indamine dyes represented for example by indophenol blue, indophenol dyes, azine dyes represented for example by safranine T, oxyazine dyes represented for example by gallocyanine, thiazine dyes represented for example by methylene blue, sulfide dyes represented for example by sulfer black T, aminoketone dyes represented for example by helindon yellow CG, oxyketone dyes represented for example by naphthazarine, anthraquinone dyes represented for example by alizarine cyanine green G, indigoid dyes represented for example by indigo, and phthalocyanine dyes represented for example by pontamine fast turquoise 8GL.

As inorganic dyes: titanium oxide, zinc oxide, aureolin, cobalt green, cerulean blue, cobalt blue, cobalt violet, ochre, sienna, red oxide, prussian blue, chromium oxide, chrome yellow, viridian, mineral violet, emerald green, vanadium yellow, vanadium blue, vermillion, minium, cadmium yellow, ultramarine, and cadmium red.

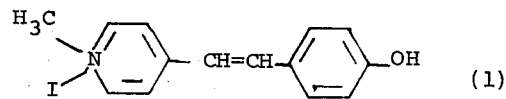

(1)

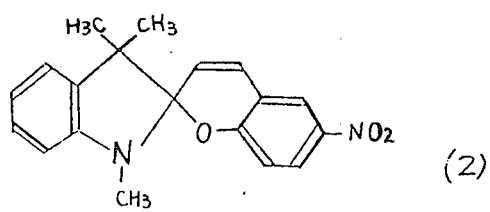

(2)

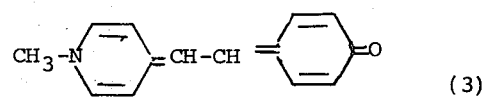

(3)

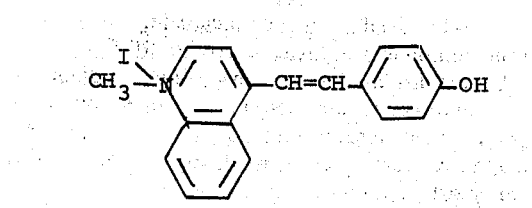
(4)
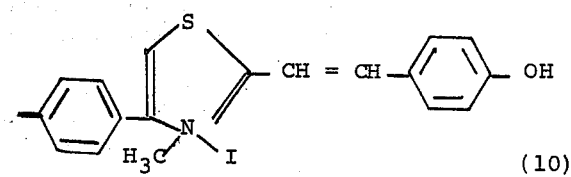
(10)
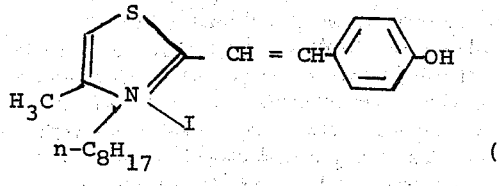
(5)
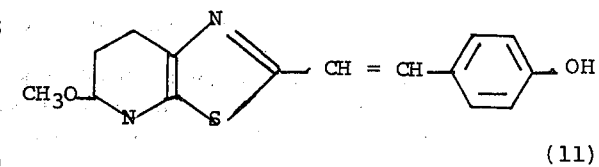
(11)
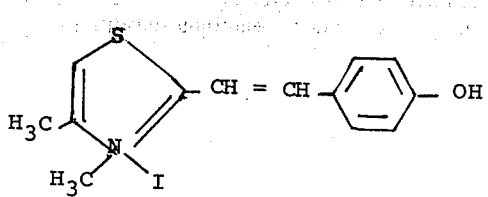
(6)
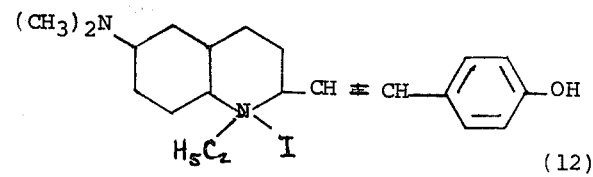
(12)
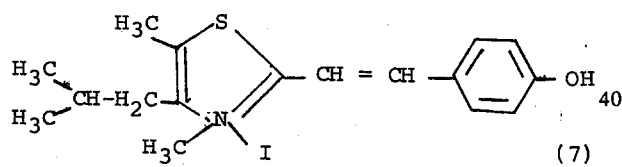
(7)
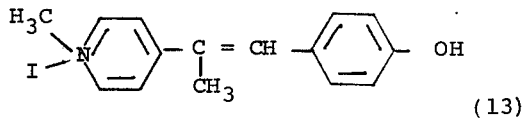
(13)
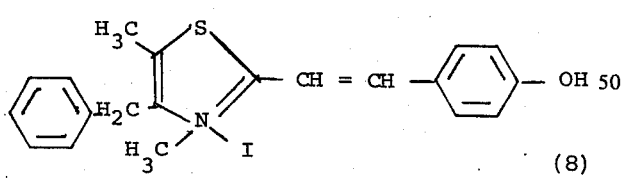
(8)
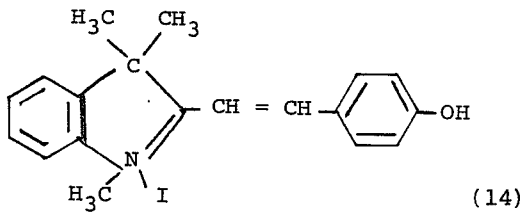
(14)
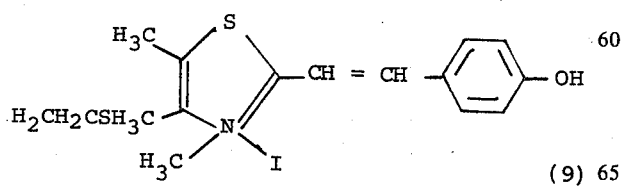
(9)
What is claimed is:
1. A color display device comprising a pair of electrodes, at least one of which is transparent, a dielectric layer provided on the inner face of at least one of those electrodes, and a solution containing at least one electrochromic dye and filled in a space between said electrodes in contact with said dielectric layer.

2. A color display device of claim 1, wherein one of the electrode is transparent and the other is non-transparent, and a dielectric layer is provided on the inner face of said non-transparent electrode.

3. A color display device of claim 1, wherein one of the electrode is transparent and the other is non-transparent, and a dielectric layer is provided on the inner face of said transparent electrode.

4. A color display device of claim 1, wherein one of the electrode is transparent and the other is non-transparent, and a dielectric layer is provided on the inner face of each of said two electrodes.

5. A color display device of claim 1, wherein both electrodes are transparent, and a dielectric layer is provided on the inner face of one of said two electrodes.

6. A color display device of claim 1, wherein both electrodes are transparent, and a dielectric layer is provided on the inner face of each of said two electrodes.

7. A color display device of claim 1, wherein said dielectric layer is of ferroelectric material.

8. A color display device according to claim 1 wherein said dielectric layer is $10^{-6}$ to $10^{-2}$ mm thick.

9. A color display device comprising two electrodes positioned opposite and parallel to each other and means adjacent thereto defining a space between said electrodes, at least one of said electrodes provided on the inner surface thereof with a dielectric layer, a solution of at least one electrochromic dye contained within the space between said opposed electrodes and in contact with said dielectric layer, which dye solution, when said solution is impressed with an electric field, causes the contained electrochromic dye solution to change color under visual light conditions.

10. A color display device comprising, in a sandwich relationship, two electrodes positioned oppose and parallel to each other and means adjacent thereto defining a space between said electrodes, each of said electrodes having a dielectric layer on the inner surfaces thereof, a solution of at least one electrochromic dye contained within the space between said opposed electrodes and in contact with said dielectric layers, which solution, when impressed with an electric field causes the contained electrochromic dye solution to change in color under visual light conditions.

* * * * *